M. H. ITTNER.
STUFFING BOX.
APPLICATION FILED MAY 6, 1914.

1,213,494.

Patented Jan. 23, 1917.

UNITED STATES PATENT OFFICE.

MARTIN HILL ITTNER, OF JERSEY CITY, NEW JERSEY.

STUFFING-BOX.

1,213,494.  Specification of Letters Patent.  Patented Jan. 23, 1917.

Application filed May 6, 1914. Serial No. 836,623.

*To all whom it may concern:*

Be it known that I, MARTIN HILL ITTNER, a citizen of the United States, residing at Jersey City, Hudson county, State of New Jersey, have invented certain new and useful Improvements in Stuffing-Boxes; and I do hereby declare the following to be a full, clear, and exact description of the invention, such as will enable others skilled in the art to which it appertains to make and use the same.

My invention relates to certain new and useful improvements in stuffing boxes, and is particularly applicable for use in connection with apparatus wherein a shaft is adapted to revolve about its axis at a high rate of speed and where it is desirable to provide a perfect seal against the passage of gas or vapor through the stuffing box in either direction, even when a considerable difference in pressure exists between the gas or vapor on one side of the stuffing box and the gas or vapor on the other side thereof, and particularly where it is further desirable that the stuffing box shall exert a very limited amount of frictional resistance to the revolution of the shaft.

The stuffing box of the present invention is especially useful in cases where the shaft operates within a liquid which is to be treated with a gas or within a liquid which is to be treated with a solid and a gas, and, particularly, when the gas used for such treatment is different from air and it is desirable to exclude the air.

So also, the stuffing box of the present invention permits the treatment of liquids, or liquids and solids, within a closed vessel substantially in the absence of the air or of other gases, in all cases where the rotation of a shaft within such closed vessel is desirable and wherein it is desirable to exclude the air therefrom. For instance, the stuffing box of the present invention is especially helpful in cases where it is desirable to operate a centrifugal pump within a closed vessel, by means of a rotatory shaft driving the pump and passing through a wall of the vessel so as to be driven from without, as is desirable in certain physical and chemical processes which require, for their safety and efficiency, a satisfactory stuffing box of the character indicated.

Figure 1:
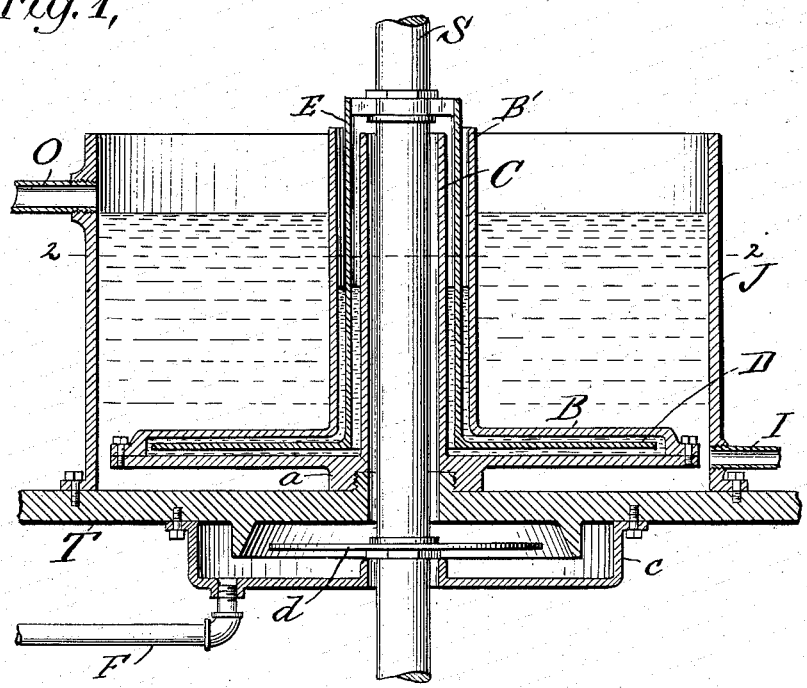
Figure 2:
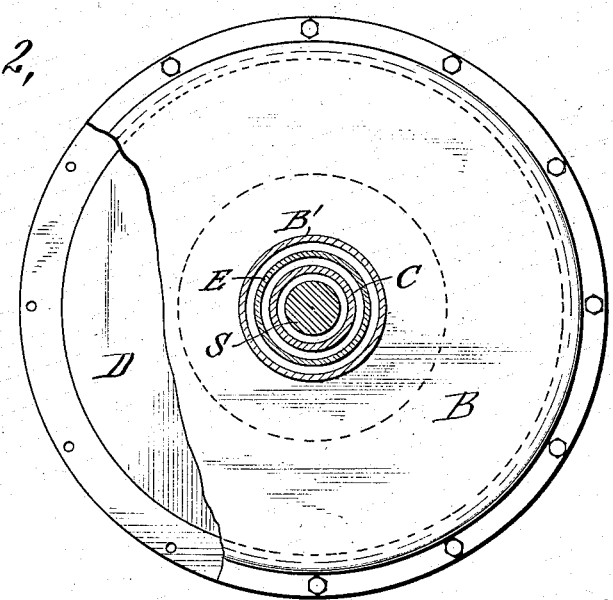

In the accompanying drawing, Figure 1 represents, in vertical section, and partial elevation, a stuffing box embodying my invention as applied to the cover of a vessel within which the shaft is designed to operate; Fig. 2 represents a view taken on the line 2—2 of Fig. 1 and illustrates partly in section and partly in plan (certain parts being shown as broken away), the construction of the main constituent parts of the stuffing box.

Similar letters of reference indicate similar parts in both views.

Referring to the drawing, T indicates a portion of the cover of a closed vessel within which is adapted to rotate the shaft S, supported on bearings in any usual manner, (not shown) as, for instance, by roller bearings or ball bearings located on the shaft either within the vessel or without, or both within and without, so as to permit the shaft to turn freely about its axis, but without longitudinal movement, and so that its axis shall be fixed with respect to the cover T. Attached to the shaft S, and revolving with it, is an inverted cup E which is rigidly attached to a disk D, which latter, as shown, is preferably, though not necessarily, integral with the cup. An inner cup C is located intermediate of the inverted cup E and the shaft S and is separated from the latter by an intervening annular space, as shown. The cup C is provided with a disk-like base having a projection $a$, whereby it is rigidly connected to the top T, as, for instance, by screw threads as shown. The cup C is provided with a cover B rigidly bolted or otherwise secured thereto and which terminates in a tubular projection B′ spaced apart from the inverted cup E. A cooling jacket J is provided with an inlet I and an outlet O whereby cooling water may circulate around B. Attached to the shaft S and revolving with it, on the underside of the cover T is the disk $d$. Below this disk $d$ is a drip cup $c$ attached to the cover T and adapted to be drained by a pipe F, as shown.

The operation of the stuffing box is as follows: The space containing the inverted cup E and disk D is filled with a suitable liquid until the disk D is entirely submerged and until the liquid reaches approximately half way up the inverted cup E. The liquid used for this purpose may be water, oil or mercury, or other liquid as the exigencies of the case may require. The liquid forms a hydraulic seal which effectively prevents the passage of gas or vapor from the atmosphere inward between the cup C and the shaft S, and the liquid likewise serves to effectually prevent the outward passage of gas or vapor from the covered receptacle. The liquid referred to will therefore form a seal that will be effective against the passage of gas or vapor through the space which it occupies until the difference in pressure within the covered vessel and outside of the vessel (or, in other words, until the difference in pressure on the liquid within the inverted cup) and the pressure on the liquid outside of the inverted cup is sufficient to alter the natural level of the liquid on either side thereof and to force gas or vapor past the periphery of the disk D. The action at any cross section through the axis of the shaft S and through the space occupied by the sealing liquid may be likened to the action in the two arms of a U-tube, one arm being the space within the inverted tube E and below the disk D, and the other arm being that portion of the space outside of the cup E, and above the disk D.

When the shaft is made to revolve about its axis, and with it the inverted cup E and the disk D, the liquid within the space surrounding the revolving disk is pressed with increased force toward the periphery of the disk D. As the speed of the disk D increases, the liquid about D is pressed with correspondingly greater force toward the periphery of the disk. This increasing pressure of the liquid in the space surrounding the disk D and toward the periphery thereof and which is due to the revolution of D about the axis of the shaft S is equivalent, in effect, to increasing the specific gravity of the liquid, and permits it to serve more effectively as a seal against the passage of gas or air out of or into the vessel closed by the cover T.

To further liken a section through the axis of the shaft S and through C, B, to a section through a U-tube, the revolution of the disk D through the liquid in which it is immersed is equivalent, in effect, to increasing the action of gravity on the liquid within the two arms of the U-tube, thus increasing the pressure necessary to alter, to any considerable extent, the natural level of the liquid in the two arms of the U-tube, that is to say, the level of the liquid within and without the inverted cup E. The result is that when the shaft S, the inverted cup E and the disk D are caused to revolve rapidly about the axis of the shaft S, the liquid seal is very much more effective than when the shaft is at rest, and it becomes possible to maintain great differences of pressure within and without the vessel closed by the cover T, without permitting any gas or vapor to pass through the liquid seal in either direction.

I do not limit myself to a smooth disk D but may use for the same purpose any revolving element provided either with blades or paddles which will result in forcing the liquid outward along such revolving element and toward its periphery, thus effecting the result I have described. In some instances, if desired, the inverted cup E, instead of being cylindrical and provided at its bottom with the disk D may be made of general conical form, that is to say, flaring downwardly and outwardly, in which event, the liquid will be pressed with increased force toward that part of E which revolves at the greatest distance from the axis of the shaft S, thus making the seal more effective.

It is of advantage to attach a disk $d$ to the shaft S, below the cover T, and beneath the disk $d$ and substantially inclosing it is a drip cup $c$ with a drain F, substantially as shown. The disk $d$ revolves with the shaft S and effectively prevents the passage of any liquid or solid material entering the stuffing box from the vessel closed by the cover T, or from the stuffing box into the vessel closed by the cover T. This is due to the fact that the disk $d$ prevents the direct passage of any liquid or solid material that may be splashed against it; and, by the revolution of the disk $d$ about the axis of the shaft S, any liquid or solid matter that may be splashed against or otherwise come in contact with the disk $d$ is thrown off, into the drip cup $c$ from which it may be removed through the pipe F.

In the drawings, I have shown the stuffing box as substantially vertical, in which position it works best, but it may be operated at an angle from the vertical, if particular conditions of use make it desirable to do so.

What I claim is:

1. In a stuffing box for a rotary shaft comprising a stationary sleeve surrounding the shaft and spaced therefrom, a second stationary sleeve surrounding the first sleeve, and spaced from said first sleeve throughout the length of the sleeves, said sleeves being joined at one end to form an annular chamber, and a third sleeve attached to said shaft beyond the open end of said chamber and projecting into said chamber out of contact with both said sleeves, said chamber containing a sealing liquid whereby the length of column of sealing liquid is limited only by the length of said sleeves.

2. A stuffing box for a rotary vertical shaft comprising a stationary sleeve surrounding said shaft and spaced therefrom, a second stationary sleeve surrounding said first mentioned sleeve, said sleeves being connected together at the bottom to form an annular chamber open at the top, a third sleeve attached to said rotary shaft above the open end of said chamber and projecting into said chamber and out of contact with either of said sleeves, and a liquid seal in said chamber and extending upward on each side of the rotary sleeve to form a sealing column effectively equal to at least twice the depth of liquid in said chamber.

3. A stuffing box for a rotary vertical shaft comprising a stationary disk surrounding said shaft having at its center a stationary sleeve projecting upwardly around said shaft and out of contact therewith, a second stationary disk attached to the first mentioned disk at its periphery and spaced therefrom within the periphery to form a chamber; said second disk having a sleeve surrounding the sleeve of the first mentioned disk and forming a vertical continuation of the chamber between the disks, and a third disk working in the chamber formed by the two stationary disks and having an elongated hub attached to the shaft above the edges of the stationary disks, said chamber containing a sealing liquid extending up into the vertical portion of said chamber on either side of the hub of said rotary disk.

4. A stuffing box for a rotary vertical shaft comprising a stationary sleeve surrounding said shaft and spaced therefrom, a second stationary sleeve surrounding said first mentioned sleeve, said sleeves being connected together at the bottom to form an annular chamber open at the top, a third sleeve attached to said rotary shaft above the open end of said chamber and projecting into said chamber and out of contact with either of said sleeves, a liquid seal in said chamber and extending upward on each side of the rotary sleeve to form a sealing column effectively equal to at least twice the depth of liquid in said chamber, and means for cooling said stuffing box consisting of a water-jacket or container inclosing said outer disk.

5. A stuffing box for a rotatory shaft, comprising a container surrounding the shaft and separated therefrom by an intervening space, and containing a sealing liquid, a rotatory element mounted upon the shaft and having a frictional surface immersed in the sealing liquid, a drip-cup to intercept accidental overflow of the sealing liquid into the receptacle in which the shaft operates, and a disk mounted upon the shaft for throwing any such overflow into the drip-cup; substantially as described.

6. A stuffing box for a rotatory shaft, comprising a container surrounding the shaft and separated therefrom by an intervening space, and containing a sealing liquid, a rotatory element mounted upon the shaft and having a frictional surface immersed in the sealing liquid, a drip-cup to intercept accidental overflow of the sealing liquid into a receptacle in which the shaft operates, and a disk mounted upon the shaft for throwing any such overflow into the drip-cup, said drip-cup being provided with a drain pipe; substantially as described.

MARTIN HILL ITTNER.

Witnesses:
C. B. SCHROEDER,
M. A. BILL.